United States Patent
Roesser

(10) Patent No.: US 8,081,210 B2
(45) Date of Patent: Dec. 20, 2011

(54) LOCATION OF BROADCAST TRANSMITTERS AND MOBILE-ADAPTATION USING MAP-BASED NAVIGATION

(75) Inventor: Robert P. Roesser, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 602 days.

(21) Appl. No.: 12/262,759

(22) Filed: Oct. 31, 2008

(65) Prior Publication Data

US 2010/0114481 A1    May 6, 2010

(51) Int. Cl.
*H04N 7/00* (2006.01)
*H04N 7/18* (2006.01)
(52) U.S. Cl. ............... 348/116; 348/113; 725/75
(58) Field of Classification Search ............... None
See application file for complete search history.

(56) References Cited

U.S. PATENT DOCUMENTS

| | | | |
|---|---|---|---|
| 6,297,763 B1 * | 10/2001 | Thomson et al. | 342/75 |
| 6,522,890 B2 * | 2/2003 | Drane et al. | 455/456.5 |
| 6,995,686 B2 * | 2/2006 | Gosdin et al. | 340/905 |
| 2006/0161344 A1 * | 7/2006 | Iwahori et al. | 701/211 |
| 2008/0263601 A1 * | 10/2008 | Hebb et al. | 725/68 |

* cited by examiner

*Primary Examiner* — John B. Walsh

(74) *Attorney, Agent, or Firm* — John A. Miller; Miller IP Group, PLC

(57) ABSTRACT

A system and method for mitigating the effects of Doppler shift, multipath and/or noise for a mobile receiver, such as on a vehicle, that is receiving broadcast television signals. The vehicle may include a map database and a GPS receiver that combine to identify the location of the vehicle on the roadway. The receiver on the vehicle includes a rotatable antenna that can be either mechanically or electronically directed towards a broadcast tower that is broadcasting the signal that the vehicle wishes to receive. Therefore, multipath effects and other noise conditions can be mitigated or eliminated by more precisely directing the antenna towards the source of a signal. Further, the receiver on the vehicle can use the forward velocity of the vehicle and the direction of the broadcasting tower to determine the movement of the vehicle relative to the tower to correct for the Doppler shift.

19 Claims, 1 Drawing Sheet

LOCATION OF BROADCAST TRANSMITTERS AND MOBILE-ADAPTATION USING MAP-BASED NAVIGATION

BACKGROUND OF THE INVENTION

1. Field of the Invention

This invention relates generally to a system and method for reducing or mitigating the effects of Doppler shift, multipath and/or noise for a mobile receiver and, more particularly, to a system and method for reducing or mitigating the effects of Doppler shift, multipath and/or noise for a television receiver on a vehicle using a map database, a GPS receiver and/or a steerable antenna.

2. Discussion of the Related Art

Conventional broadcasting of data, such as television transmission signals, typically uses analog signals. In North America, television stations will be transitioning to a digital format where the television transmission signals will typically be produced and transmitted using an advanced television standards committee (ATSC) data frame protocol, well known to those skilled in the art. With the advent of digital data broadcasting techniques, the same amount of information to be broadcast requires less bandwidth as compared to broadcasting analog signals. Therefore, broadcasting data using digital signals allows additional data to be broadcast for a given bandwidth while still delivering high quality programs. The additional data can be used for many applications, including alternative television programming and other data related services, including the transmission of weather information, traffic information and audio and video files. Further, the transition to digital television transmission enables new receiver technology.

Data is generally transmitted in the form of multiple data frames. Each data frame transmitted to a non-moving receiver typically includes a frame sync portion and a data portion. The frame sync portion allows the receiver to lock onto the received signal so that the transmitted signal can be received and deciphered by the receiver. In one technique, the frame sync portion locks onto the receiver with the received signal by setting equalization coefficients in the receiver.

After a certain period of time, a non-moving receiver goes out of synchronization with the incoming signals. This happens as a result of data dispersion caused by multipath fading during signal propagation. Multipath fading causes errors that affect the quality of reception. The errors are due to intersymbol interference (ISI). ISI is a form of distortion of a signal in which one symbol interferes with subsequent symbols. This is an unwanted phenomenon as the previous symbols have a similar effect to noise, thus making the communication less reliable. Equalizers can be used to correct ISI. Hence, in the case of non-moving receivers, the receiver is locked with the received signals using the frame sync after every predefined interval of time for continuous reception of the data without any significant loss.

For a moving receiver, the data frame suffers additional dispersion caused by the Doppler shift along with the distortion caused by ISI due to the multipath fading. Therefore, a receiver in a moving vehicle needs to resynchronize with the incoming data frames more frequently as compared to a stationary or non-moving receiver for successful reception of the data without any significant loss. However, due to the time interval between the transmission of the sync data, receivers in a moving vehicle are not able to adjust the equalizer coefficients as fast as desired, which causes loss of synchronization and loss of a significant portion of the data.

Further, reception quality is reduced by multipath effects. Multipath effects occur as a result of the receiver receiving the broadcast signal from the broadcast tower for multiple directions as a result of the broadcast signal being reflected off of objects between the tower and the receiver, such as buildings, terrain, etc. Because the several signals are received by the receiver at different times, they are out of phase with each other, which affects the ability of the receiver to process the signals.

Current and future vehicles may include map databases, traffic information systems, entertainment systems, etc. that require continuous, or near continuous, updating in order to be effective. Typically, updating techniques for these types of systems need to be low cost in order to be marketable. Data casting using ATSC digital television is one potential technique for providing such a low cost technique. Further, it may be desirable in some vehicles or vehicle systems to receive broadcast television signals using ATSC signals.

SUMMARY OF THE INVENTION

In accordance with the teachings of the present invention, a system and method are disclosed for mitigating the effects of Doppler shift, multipath and/or noise for a mobile receiver, such as on a vehicle, that is receiving broadcast television signals. The vehicle may include a map database and a GPS receiver that combine to identify the location of the vehicle on the roadway. The map database also includes the location of broadcast towers that the vehicle may be receiving the television signals from. The receiver on the vehicle includes a rotatable or steerable antenna that can be either mechanically or electronically directed towards a broadcast tower that is broadcasting the signal that the vehicle wishes to receive. Therefore, multipath effects and other noise conditions can be mitigated or eliminated by more precisely directing the antenna towards the source of a signal. Further, the receiver on the vehicle can use the forward velocity of the vehicle and the direction of the broadcasting tower to determine the movement of the vehicle relative to the tower to correct for the Doppler shift. Also, the map database can include location-dependent channel characteristics for the signal from a broadcast tower, especially in the case of identified trouble spots, to help the receiver adapt to the signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for mitigating the effects of Doppler shift, multipath and/or noise for a moveable receiver that is receiving television broadcast signals is merely exemplary in nature, and is in no way intended to limit the invention or its applications or uses. For example, the present invention has particular application for a television receiver on a vehicle. However, as will be appreciated by those skilled in the art, the system and method of the invention may have application for other mobile receivers other than vehicle receivers.

Figure 1:
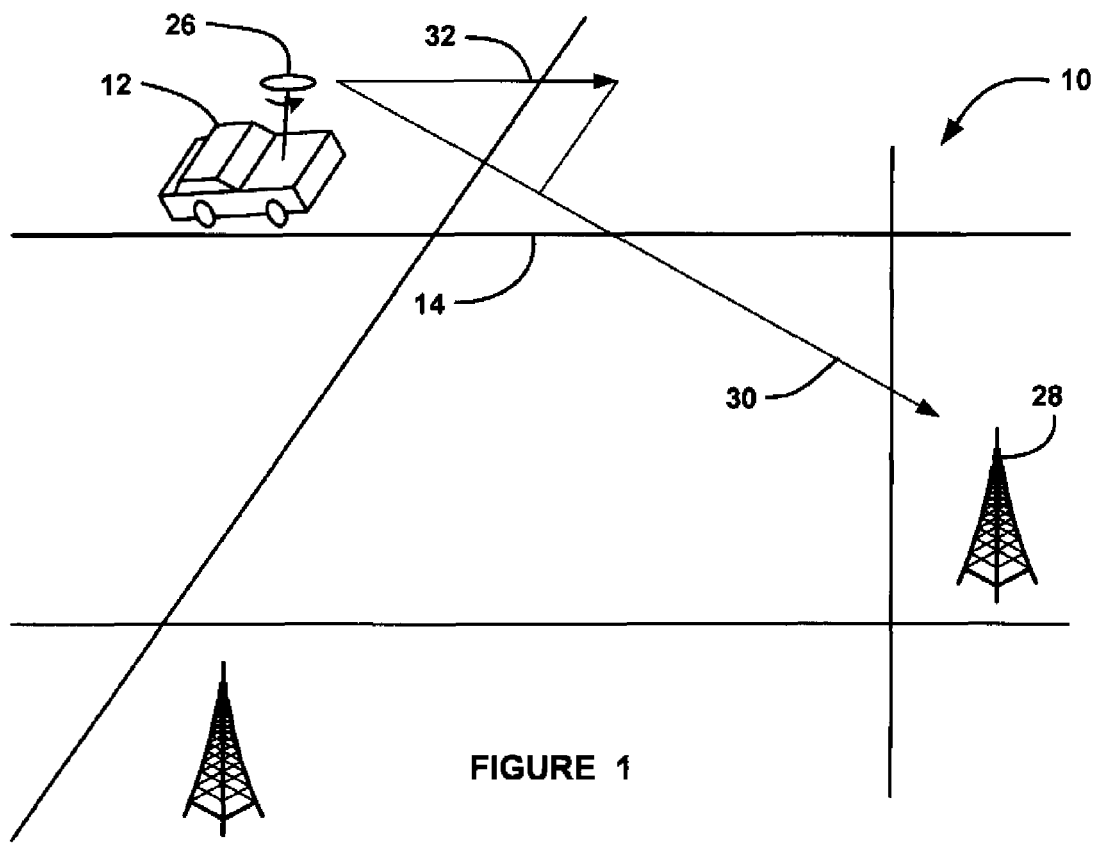
FIG. 1 is a plan view of a vehicle traveling on a roadway relative to television broadcast towers.

FIG. 1 is a plan view of a system 10 used in connection with a vehicle 12 that allows the vehicle 12 to more effectively receive broadcast television signals by reducing or mitigating the effects of Doppler shift that occurs because of movement of the vehicle 12 and by reducing or mitigating multipath effects. The vehicle 12 is shown travelling along a roadway 14.

Figure 2:
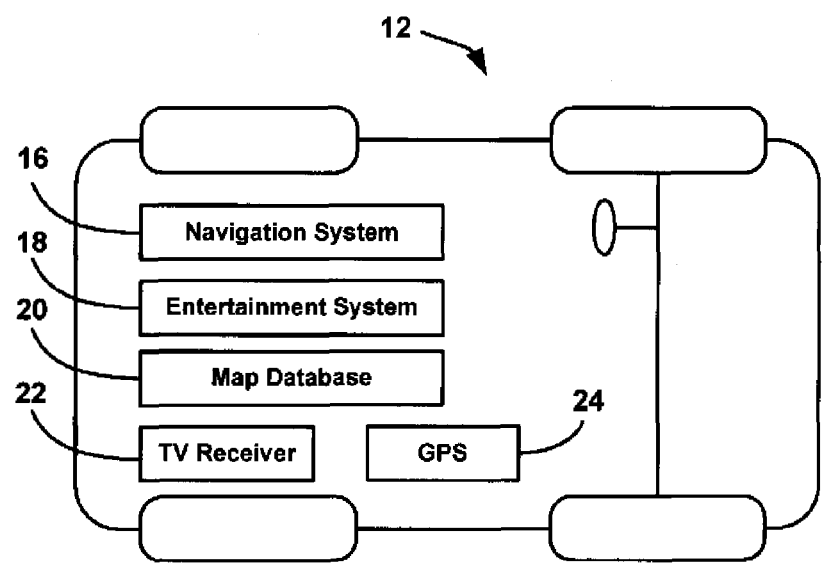
FIG. 2 is a simplified plan view of the vehicle shown in FIG. 1 including a television receiver, a map database and a GPS receiver that are used to determine the direction of the broadcast towers relative to the movement of the vehicle.

FIG. 2 is a plan view of the vehicle 12 showing various systems thereon including a navigation system 16, an entertainment system 18, a map database 20, a television receiver 22 that receives the broadcast signals and a GPS receiver 24, all which are well known to those skilled in the art. The vehicle 12 includes a rotatable or steerable antenna 26 that can be steered towards a particular broadcast tower 28 that is broadcasting television signals that the vehicle occupants currently wish to receive. Multiple broadcast towers 28 are shown that may broadcast the signals for several different television channels that the receiver 22 is able to receive. A tower vector 30 represents the direction and speed of the vehicle 12 relative to the position of the tower 28 and a forward vector 32 represents the speed and direction of the vehicle 12 along its direction of travel on the roadway 14.

The map database 20 includes information showing the roadway 14, the broadcast towers 28 and other points of interest that a vehicle database may include, such as restaurants, gas stations, hospitals, etc. The GPS receiver 24 identifies the location of the vehicle 12, which is correlated to the roadway 14 so that the navigation system 16 can display the location of the vehicle 12 on a map within the vehicle 12 in manner that is well understood in the art. The broadcast signals from the tower 28 include video and audio signals associated with a particular channel that the tower 28 is broadcasting.

The signals from the broadcast tower 28 may also include data that is part of the frame sets in the digital broadcast information that is not used by a television receiver, but can be used for other purposes, such as updating the entertainment system 18 and the map database 20. Further, the receiver 22 allows the entertainment system 18 to use the video and audio signals broadcast by the tower 28 so that occupants in the vehicle 12 can watch broadcast television channels. However, in order to allow the receiver 22 to effectively receive the broadcast signals with the presence of various deleterious effects, such as Doppler shift, multipath effects, noise, etc., as discussed above, certain measures need to be taken at the vehicle 12.

In order to overcome the effects of Doppler shift, the receiver 22 receives a vehicle speed signal either from the GPS receiver 24, a vehicle speed sensor (not shown) on the vehicle 12, or some other suitable technique that identifies the speed of the vehicle 12. The receiver 22 also knows the direction of the vehicle 12 from a compass heading, or otherwise, and thus, can calculate the forward vector 32. The receiver 22 also knows the direction of a particular tower 28 from the map database and the GPS information, and thus, can calculate the tower vector 30 using the vehicle speed, the vehicle direction and the direction of the tower 28. From this information, the receiver 22 can calculate the velocity of the vehicle 12 relative to the tower 28 by the triangle formed from the vectors 32 and 30. Thus, the receiver 22 can compensate for the motion of the vehicle 12 relative to the tower 28, and thus, cancel the Doppler shift. Therefore, the receiver 22 can remain tuned to the broadcast signals from the tower 28 as it moves.

Further, because the antenna 26 is steerable it can be directed towards the tower 28 because the receiver 22 knows the exact direction of the tower 28 from the map database and GPS information. By directing the antenna 26 towards the tower 28, a focusing effect can be provided where other signals that are not from the direction of the tower 28 will not significantly effect or be received by the antenna 26. These other effects may include other noise and multipath effects as a result of reflections of the signal off of various structures, such as buildings, in the particular environment that the vehicle 12 is traveling. Any suitable technique for steering the antenna 26 can be employed whether it is a mechanical steering mechanism or an electronic steering mechanism, such as digital beamforming. By providing a narrow angle for the antenna 26, other interfering noise can be eliminated.

Additionally, the map database 20 can store the location of dead zones in the map database 20 associated with reception of the signals from the broadcast tower 28. These dead zones may be caused by any number of features, such as valleys, tall buildings, trees, etc. By knowing where the dead zones are located relative to a particular broadcast tower 28, the directivity of the antenna 26 can be changed accordingly so that the antenna 26 receives reflections off of various structures from the broadcast tower 28, instead of the direct signal reception. Further, the gain of the antenna 26 may be increased so that the signal is more easily received.

Also, the map database 20 can include location-dependent channel characteristics for the signal from a broadcast tower 28, especially in the case of identified trouble spots, to help the receiver 22 adapt to the signal.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for improving reception of broadcast television signals at a moveable platform from a broadcast tower, said system comprising:
   a GPS receiver provided on the moveable platform that provides information identifying the location of the moveable platform;
   a map database provided on the moveable platform that identifies the location of features around the moveable platform including the location of the broadcast tower, said map database storing information about dead zones and/or channel characteristics of the broadcast signals from the broadcast tower, where the dead zones may be caused by terrestrial or structural obstructions;
   a television receiver provided on the moveable platform that processes broadcast signals received from the broadcast tower, said television receiver taking preventative measures if the moveable platform is in a dead zone or adversely affected by channel characteristics; and
   an antenna provided on the moveable platform that receives the broadcast signals from the broadcast tower and sends the broadcast signals to the television receiver to be processed, said television receiver correcting a Doppler shift caused by the motion of the moveable platform relative to the broadcast tower by determining a forward vector based on the speed and direction of the moveable platform and a tower vector based on the speed and direction of the moveable platform relative to the broadcast tower and using the forward vector and the tower vector to determine the relative speed of the moveable platform to the broadcast tower.

2. The system according to claim 1 wherein the antenna is a steerable antenna, said television receiver steering the steerable antenna towards the broadcast tower by using the map database and the GPS information.

3. The system according to claim 2 wherein the steerable antenna is a mechanically steered antenna.

4. The system according to claim 2 wherein the steerable antenna is an electronically steerable antenna.

5. The system according to claim 1 further comprising an entertainment system provided on the moveable platform.

6. The system according to claim 5 wherein the entertainment system uses data in the broadcast signals to download updated entertainment information.

7. The system according to claim 5 wherein the entertainment system uses video and audio information in the broadcast signal to provide television entertainment.

8. The system according to claim 1 wherein the moveable platform is a vehicle.

9. The system according to claim 2 wherein the preventive measures include steering the antenna to receive a reflected signal.

10. A system for improving reception of broadcast television signals at a vehicle from a broadcast tower, said system comprising:
a GPS receiver provided on the vehicle that provides signals identifying the location of the vehicle;
a map database provided on the vehicle that identifies the location of features around the vehicle including the location of the broadcast tower, said map database storing information about dead zones and/or channel characteristics of the broadcast signals from the broadcast tower, where the dead zones may be caused by terrestrial or structural obstructions;
a television receiver provided on the vehicle that processes broadcast signals received from the tower, said television receiver taking preventative measures if the vehicle is in a dead zone or adversely affected by channel characteristics; and
a steerable antenna provided on the vehicle that receives the broadcast signals from the broadcast tower and sends the broadcast signals to the television receiver to be processed, said television receiver correcting a Doppler shift caused by the motion of the vehicle relative to the broadcast tower by determining a forward vector based on speed and direction of the vehicle and a tower vector based on the speed and direction of the vehicle relative to the broadcast tower and using the forward vector and the tower vector to determine the relative speed of the vehicle to the broadcast tower, said television receiver further steering the steerable antenna towards the broadcast tower by using the map database and the GPS information,
said preventive measures including steering the steerable antenna away from the broadcast tower to receive a reflected signal.

11. The system according to claim 10 wherein the steerable antenna is a mechanically steerable antenna.

12. The system according to claim 10 wherein the steerable antenna is an electronically steerable antenna.

13. The system according to claim 10 further comprising an entertainment system provided on the vehicle.

14. The system according to claim 13 wherein the entertainment system uses data in the broadcast signals to download updated entertainment information.

15. The system according to claim 13 wherein the entertainment system uses video and audio information in the broadcast signal to provide television entertainment.

16. The system according to claim 10 wherein the map database uses data in the broadcast signal to update the map database.

17. A system for improving the reception of broadcast television signals at a vehicle from a broadcast tower, said system comprising:
a GPS receiver provided on the vehicle that provides information identifying the location of the vehicle;
a map data base provided on the vehicle that identifies the location of features around the vehicle including the location for the broadcast tower;
an entertainment system provided on the vehicle, said entertainment system using video and audio information in the broadcast signals to provide television entertainment;
a television receiver provided on the vehicle that processes the broadcast signals received from the broadcast tower; and
a steerable antenna provided on the vehicle that receives the broadcast signal to the broadcast tower and sends the broadcast signals to the television receiver to be processed, said television receiver correcting a Doppler shift from motion of the vehicle relative to the broadcast tower by determining a forward vector based on the speed and direction of the vehicle and a tower vector based on the speed and direction of the vehicle relative to the broadcast tower and using the forward vector and the tower vector to determine the relative speed of the vehicle to the broadcast tower, said television receiver steering the steerable antenna towards the broadcast tower by using the map database and the GPS information, said television receiver using data in the broadcast signals to download and update entertainment information for the entertainment system and data in the broadcast signal to update the map database.

18. The system according to claim 17 wherein the map database stores information about dead zones and/or channel characteristics of the broadcast signals from the broadcast tower, said television receiver taking preventative measures if the vehicle is in a dead zone or adversely affected by channel characteristics.

19. The system according to claim 17 wherein the steerable antenna is a mechanically steerable antenna or an electronically steerable antenna.

* * * * *